July 21, 1942.      A. W. BULL      2,290,670
INNER TUBE
Filed Aug. 27, 1940
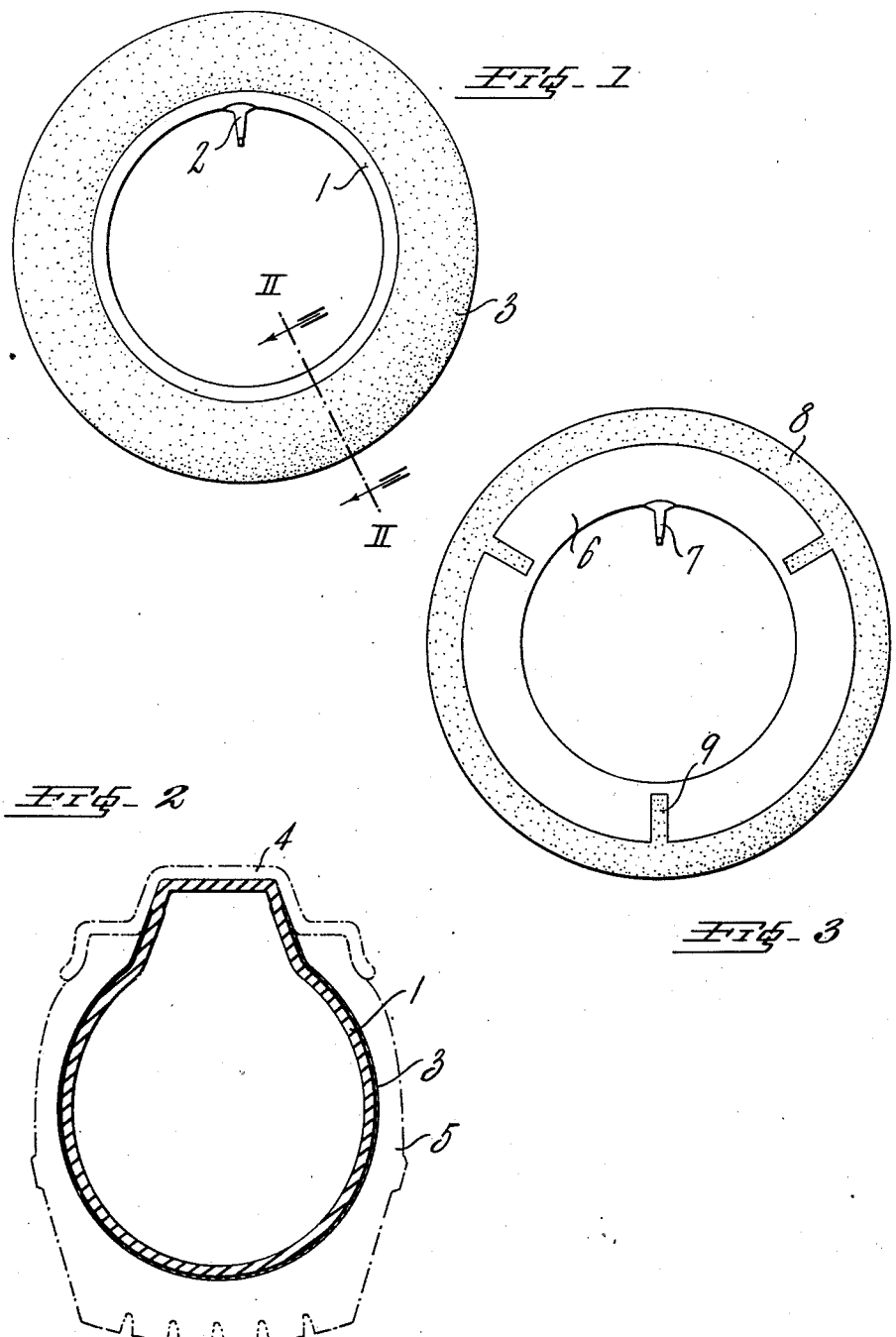
INVENTOR.
ARTHUR W. BULL
BY Lester G. Budlong
ATTORNEY Patented July 21, 1942

2,290,670

UNITED STATES PATENT OFFICE 2,290,670

INNER TUBE

Arthur W. Bull, Grosse Pointe, Mich., assignor to United States Rubber Company, New York, N. Y., a corporation of New Jersey Application August 27, 1940, Serial No. 354,342

6 Claims. (Cl. 152—330)

This invention relates to inner tubes for pneumatic tires and, in particular, it relates to an inner tube having its outer surface protected with a layer of electrically conducting material.

In the manufacture and use of inner tubes, their outer surface usually becomes coated with a lubricating material applied either for the purpose of reducing the tacky condition of the rubber composition or for the purpose of facilitating handling and assembly of the inner tube. Also, the interior of the tire carcass with which the inner tube is assembled presents a contacting surface of various materials other than rubber composition. While rubber composition in itself is generally considered to be a non-conductor of electricity, many of such lubricating or other foreign materials present at the surface of the inner tube produce electrically conducting paths of varying resistance.

It is recognized that static is generated by automotive vehicles and that the static so generated tends to discharge through the tires of the vehicle and to the ground. In the discharge of static from vehicles, it frequently occurs that the static follows a broken path on or adjacent the outer surface of the inner tube. Where the path is broken the static charge produces a spark resulting in the generation of ozone in close proximity to the outer surface of the inner tube. The presence of ozone is detrimental to rubber composition and its presence in the region of the outer surface of the inner tube produces a checking or cracking of the inner tube frequently resulting in premature failure of the tube.

In order to overcome this condition, I treat the outer surface of an inner tube by providing thereon a thin layer of a rubber composition having electrically conducting characteristics. This layer of conducting rubber forms a protective sheath over the surface of the inner tube and provides a path through which the static may be discharged or sparking conditions substantially eliminated due to the uniform potential at the surface of the inner tube.

Among the objects of my invention are to provide means in combination with an inner tube for eliminating static increasing sparks in the region of the inner tube thereby increasing the life of the inner tube; and to provide an inner tube having an electrically conducting surface portion which may be manufactured efficiently and economically. These and other objects and advantages will appear more fully in the following detailed description when considered in connection with the accompanying drawing, in which:

Fig. 1 is a side elevational view of an inner tube embodying the invention;

Fig. 2 is a transverse view, in section, of an inner tube taken along lines II—II of Fig. 1 and illustrating the tube in assembly relationship with a tire and rim; and Fig. 3 is a side elevational view of an inner tube illustrating a modified form of the invention.

Referring to the drawing and, in particular, to Fig. 1, I show an inner tube I provided with a conventional valve stem 2. The outer surface of the crown and sidewall portions of the inner tube is coated with a layer 3 of electrically conducting rubber cement. The electrically conducting cement may be applied to the surface of the inner tube prior to vulcanization of the tube or it may be applied to the tube after vulcanization and the tube replaced in the vulcanizing mold for the purpose of effecting vulcanization of the layer of electrically conducting cement. Vulcanization of the cement may be omitted and the cement allowed to dry after its application to a vulcanized inner tube.

As shown in Fig. 2, it is merely necessary for the layer of conducting cement to contact with a rim 4 with which the tube and a tire 5 are associated. Therefore, the conducting layer need not extend around the inner tube throughout its entire contacting portion of the rim. However, there is no objection to the layer of conducting cement covering the entire outer surface of the inner tube.

An example of an electrically conducting cement suitable for providing conducting characteristics over the surface of the inner tube is as follows:—

|  | Parts by weight |
| --- | --- |
| Rubber | 100 |
| Acetylene black | 60 |
| Stearic acid | 6 |
| Pine tar | 4 |
| Zinc oxide | 4 |
| Accelerator | 1 |
| Sulfur | 3 |

While 60 parts of acetylene black is illustrated, it has been found that varying results are obtained depending upon the quantity of acetylene black incorporated, and that good results have been obtained by employing at least 15% by weight of the acetylene black. The materials are milled together and subsequently dissolved in a suitable solvent such as gasoline or benzene. The cement may be applied to the inner tube by a painting, spraying or dipping operation and a relatively thin coat will provide an adequate protection for the tube. Preferably the dry or vulcanized layer of electrically conducting rubber composition should have a thickness in the order of .001 to .003 inch.

Fig. 3 illustrates a modified form of the invention comprising an inner tube 6 of rubber composition and a conventional valve stem 7. A layer 8 of electrically conducting cement is applied to the outer surface of the inner tube at the crown portion only. One or more layers 9 of conducting cement may be applied radially of the inner tube to form a path extending from the circumferential layer 8 to a point which normally will contact with the rim on which the tube is mounted. The purpose of this modification is to illustrate that it is not essential to cover the greater part of the inner tube with conducting cement but that a plurality of conducting paths leading from the tire rim to a circumferential layer of conducting cement at the crown portion of the tube will function effectively in preventing the accumulation of a potential capable of damaging the remaining portion of the tube by static sparks.

From the forgoing disclosure it is believed apparent that I have provided means for effectively preventing a discharge of static sparks in the region of the inner tube, which means being of a resilient nature, does not otherwise interfere or detract from the normal function of the inner tube.

It is to be understood that artificial rubber compositions may be used in lieu of the rubber compositions herein described within the invention.

While I have shown and described a preferred embodiment of my invention, it is to be understood that obvious modifications are intended within the spirit of the invention and the scope of the appended claims.

Having thus shown and described my invention, what I claim and desire to protect by Letters Patent is:

1. An inner tube comprising an annular and tubular body of rubber composition and a layer less than one hundredth of an inch thick of electrically conducting composition vulcanized directly to a substantial portion of the outer surface of the inner tube and having an electrical resistivity far below that of the rubber composition of said tubular body.

2. An inner tube comprising an annular and tubular body of rubber composition and a layer less than one hundredth of an inch thick of electrically conductive dry residue of a cement of conductive rubber composition applied to a substantial portion of the outer surface of the inner tube, said layer containing at least 15% by weight of acetylene carbon black and having an electrical resistivity far below that of the rubber composition of said tubular body.

3. An inner tube comprising an annular and tubular body of rubber composition and a layer less than one hundredth of an inch thick of an electrically conductive dry residue of a cement of conductive rubber composition applied directly to the circumferential crown portion of the outer surface of the inner tube and having an electrical resistivity far below that of the rubber composition of said tubular body.

4. An inner tube comprising an annular and tubular body of rubber composition, and a layer less than one hundredth of an inch thick of the vulcanized residue of an electrically conducting rubber cement applied directly to the circumferential crown portion of the outer surface of the inner tube and forming a radial path to the rim engaging region of the tube and having an electrical resistivity far below that of the rubber composition of said tubular body.

5. An inner tube comprising an annular and tubular body of rubber composition and a layer less than one hundredth of an inch thick of an electrically conductive dry residue of a cement of conductive rubber composition directly applied to a substantial portion of the outer surface of the inner tube and having an electrical resistivity far below that of the rubber composition of said tubular body.

6. An inner tube comprising an annular and tubular body of rubber composition and a layer less than one hundredth of an inch thick of vulcanized electrically conductive dry residue of a cement of conductive rubber composition vulcanized directly to a substantial portion of the outer surface of the inner tube and having an electrical resistivity far below that of the rubber composition of said tubular body.

ARTHUR W. BULL.